United States Patent
Li et al.

(10) Patent No.: US 12,001,514 B2
(45) Date of Patent: Jun. 4, 2024

(54) IMAGE CLASSIFICATION MODELING WHILE MAINTAINING DATA PRIVACY COMPLIANCE

(71) Applicant: Microsoft Technology Licensing, LLC, Redmond, WA (US)

(72) Inventors: Ji Li, San Jose, CA (US); Youjun Liu, Palo Alto, CA (US); Amit Srivastava, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/047,324

(22) Filed: Oct. 18, 2022

(65) Prior Publication Data
US 2023/0066050 A1   Mar. 2, 2023

Related U.S. Application Data

(63) Continuation of application No. 16/276,908, filed on Feb. 15, 2019, now Pat. No. 11,507,677.

(51) Int. Cl.
*G06F 18/21* (2023.01)
*G06F 18/25* (2023.01)
*G06F 21/62* (2013.01)
*G06N 20/00* (2019.01)

(52) U.S. Cl.
CPC .......... *G06F 18/217* (2023.01); *G06F 18/254* (2023.01); *G06F 21/6218* (2013.01); *G06N 20/00* (2019.01)

(58) Field of Classification Search
CPC ..... G06N 20/00; G06F 21/6218; G06F 21/60; G06K 9/6262
See application file for complete search history.

(56) References Cited

U.S. PATENT DOCUMENTS

2021/0319098 A1*  10/2021  Pogorelik ................ G06N 5/04

OTHER PUBLICATIONS

"Office Action Issued in European Patent Application No. 20709856.7", dated Jun. 7, 2023, 7 Pages.

* cited by examiner

*Primary Examiner* — Olugbenga O Idowu

(57) ABSTRACT

The present disclosure relates to processing operations that execute image classification training for domain-specific traffic, where training operations are entirely compliant with data privacy regulations and policies. Image classification model training, as described herein, is configured to classify meaningful image categories in domain-specific scenarios where there is unknown data traffic and strict data compliance requirements that result in privacy-limited image data sets. Iterative image classification training satisfies data compliance requirements through a combination of online image classification training and offline image classification training. This results in tuned image recognition classifiers that have improved accuracy and efficiency over general image recognition classifiers when working with domain-specific data traffic. One or more image recognition classifiers are independently trained and tuned to detect an image class for image classification. Training of independent image recognition classifiers is also utilized for training and tuning of deeper learning models for image classification.

20 Claims, 5 Drawing Sheets

FIGURE 4

IMAGE CLASSIFICATION MODELING WHILE MAINTAINING DATA PRIVACY COMPLIANCE

RELATED APPLICATIONS

This application claims the benefit of and priority to U.S. patent application Ser. No. 16/276,908, filed Feb. 15, 2019, entitled "IMAGE CLASSIFICATION MODELING WHILE MAINTAINING DATA PRIVACY COMPLIANCE," which is hereby incorporated by reference in its entirety for all purposes.

U.S. Pat. No. 10,891,514, filed on Dec. 17, 2018, issued Jan. 12, 2021, entitled "IMAGE CLASSIFICATION PIPELINE," is hereby incorporated by reference in its entirety.

BACKGROUND

Image analysis services are utilized to analyze image data to aid processing of image data for applications/services. However, image analysis processing often requires a tremendous amount of computational resources to build, maintain and operate image analysis modeling. For a single user image, multiple deep learning models are typically executed together with other image analyzers to generate image recognition results for the user image. This type of processing is so comprehensive, a graphics processing unit (GPU) is typically required execute image analysis, which is costly from a resource perspective as well as a latency perspective. As such, traditional image analysis processing is not optimal for real-time (or near real-time) processing of image data, for example, where results are required almost immediately to aid application execution.

Further technical issues result from the fact that image analysis modeling is not typically configured to work in domain-specific contexts. A corpus of training data is key to accuracy of an image classification model. However, traditional image classification models are generally trained and not tuned for domain-specific analysis. As such, traditional image classification models struggle with accuracy as well as efficiency in processing image content in domain-specific contexts.

Additional technical challenges exist with attempting to navigate image classification while managing stringent data privacy and compliance policies. Data compliance regulations and policies limit data usage for model training. For example, user images may not be able to be logged for offline image classification analysis, which can significantly limit the ability to train a model for image classification. Furthermore, due to data compliance requirements, an image classification model may not have compliant data for labeling training. Additional training challenges exists where image data sets that are compliant for logging and data storages may contain biases. For instance, there may be a limited variety of image content in image data sets used for training and/or only certain groups of users choose to allow their data for training. This can affect precision and accuracy of an image classification model at run-time, especially in domain-specific applications.

SUMMARY

In view of the foregoing technical challenges, the present disclosure relates to processing operations that execute image classification training for domain-specific traffic, where training operations are entirely compliant with data privacy regulations and policies. Image classification model training, as described herein, is configured to classify meaningful image categories in domain-specific scenarios where there is unknown data traffic and strict data compliance requirements that result in privacy-limited image data sets. Iterative image classification training satisfies data compliance requirements through a combination of online image classification training and offline image classification training. This results in tuned image recognition classifiers that have improved accuracy and efficiency over general image recognition classifiers when working with domain-specific data traffic. Image recognition classifiers are independently trained and tuned to detect an image class through image classification processing. In some examples, multiple independent image recognition classifiers may be trained to detect a single image class. Training of independent image recognition classifiers is also utilized for training and tuning of deeper learning models for image classification.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

The present disclosure relates to processing operations that execute image classification training for domain-specific traffic, where training operations are entirely compliant with data privacy regulations and policies. Image classification model training, as described herein, is configured to classify meaningful image categories in domain-specific scenarios where there is unknown data traffic and strict data compliance requirements that result in privacy-limited image data sets. Iterative image classification training satisfies data compliance requirements through a combination of online image classification training and offline image classification training. This results in tuned image recognition classifiers that have improved accuracy and efficiency over general image recognition classifiers when working with domain-specific data traffic. One or more image recognition classifiers are independently trained and tuned to detect an image class for image classification within a specific domain. Training of independent image recognition classifiers is also utilized for training and tuning of deeper learning models for image classification.

Domain-specific traffic may be data traffic specific to one or more applications/services. As a non-limiting example, an image recognition classifier may be trained and tuned to evaluate unknown data traffic of a specific application/service such as a digital presentation application/service. Other examples of applications/services are subsequently described. When users are working with digital presentation content (e.g., slide-based digital presentations), the types of image content that are utilized may be very different from that in which a user is utilizing image content for a search engine request. Image classification results can be utilized to help improve operation of that specific application/service, for example, where contextual suggestions, task recommendations, etc., that are generated on behalf of a user, may be uniquely created for a relevant context and improved as compared with traditional suggestions that fail to consider image content that a user is working with.

Image recognition classifiers are independently trained and tuned to detect images classes for domain-specific data traffic that is specific to one or more applications/services as described herein. For instance, several binary classifiers, as image recognition classifiers, are trained to cover image content traffic commonly found through user usage of an application/service. In one example, multiple binary classifiers may be trained to focus on single image class. During real-time image classification processing, this may improve the accuracy, speed, and efficiency of image classification processing through the use of smaller, lightweight, and targeted models as compared to a requiring operation of a much larger and slower deep learning model.

Data compliance requirements may be any policies, rules, regulations, etc., that specify how an entity can utilize content added through its applications/services. The present disclosure specifically focuses on usage of image content for training purposes and aspects of data privacy rules and regulations that specify how image content can be used and whether it can be stored for purposes including image classification training. A non-limiting example of a data compliance regulation is the General Data Protection Regulation (GDPR) and associated legislature. It is to be understood that the present disclosure aims to protect data privacy and user rights, where its image classification modeling is trained in a way that satisfies strict compliance with data compliance requirements. Current data compliance requirements may enable an entity to execute online image classification training while image content is actively being utilized in an online session of an application/service. In instances, where the user is not actively utilizing the image content in an online session of an application/service, the same image content cannot be logged. In other instances, data compliance policies may have strict requirements for logging image embeddings associated with user image content.

To satisfy data compliance requirements, training of image recognition classifiers of the present disclosure is an iterative process. One or more image data sets is utilized for initial training of an image recognition model. The image data in such image data sets is image content that satisfies data compliance requirements for storing and working with such image content. A specific image recognition model implementing an image recognition classifier is iteratively trained to improve accuracy, precision, efficiency, reduce latency, etc., through online training evaluation and offline training evaluation. As referenced above, data compliance requirements may prevent an application/service from logging user added image content for various reasons including but not limited to: data privacy regulations, usage policies and legal reasons such as copyright law, among other examples. An application/service looking to train an image recognition model offline may not be able to utilize actual user image content to train its modeling. However, the image content used by users may be unique to a contextual experience provided through a specific application/service, which requires understanding of that image content beyond how general image recognition classifiers are normally trained (i.e., through already available image data sets that contain image content that is compliant for data logging purposes). As such, the present disclosure recognizes data compliance requirements regarding usage of image content for image classification training purposes and develops training systems and methodologies that satisfy data compliance requirements for usage of user image content to train image recognition classifiers. Processing operations of the present disclosure execute online image classification training on the image content and propagate results of that online training evaluation (including labeling of the image content) for subsequent offline training evaluation in a manner that does not violate data compliance requirements. In this way, training of an image recognition classifier can be thorough to achieve high precision accuracy when working with domain-specific content.

Processing operations described herein including operations related to training of image classification modeling/image recognition modeling may be executed by an exemplary image classification training component. An image classification training component may be a component of an image recognition pipeline, where the image recognition pipeline is a system of components (hardware and/or software) configured to manage image recognition processing for image content accessed through an application/service. The image classification training component trains and tunes image recognition modeling to handle domain-specific traffic of an application/service (or suite of applications/services), where the image recognition pipeline further comprises a scheduling component to select tune image recognition models for image classification processing at run-time (e.g., real-time or near real-time). In this way, real-time image recognition processing can utilize image recognition modeling that is tuned specifically to evaluate domain-specific traffic associated with an application/service. If a different application/service is accessed that comprises a different type of data traffic, the image recognition pipeline can select different image recognition models that have been tuned for that domain-specific traffic. Additionally, the image recognition pipeline is configured to select an order in which image recognition modeling is applied to evaluate image content used in an application/service. For example, execution of image recognition models may occur in batches where execution may correspond with a predicted execution time to return image classification results for image content so that results are most relevant to a context in which the image content is being utilized through an application/service.

Exemplary technical advantages provided by processing described in the present disclosure comprise but are not limited to: improved accuracy and precision for image recognition models over traditional image recognition modeling through iterative training processing that tailors image classification processing for domain-specific traffic; creation and implementation of an exemplary image recognition pipeline that trains image recognition modeling and exposes the trained image recognition modeling for real-time (or near real-time) image classification processing; an ability to adapt device configurations to optimize training of image recognition modeling; an ability to service a plurality of applications/services through an image recognition pipeline by training and tuning different image recognition modeling (lightweight and deep learning) for specific application/service execution; improved processing efficiency (e.g., reduction in processing cycles, saving resources/bandwidth) for computing devices during execution of training for image classification processing; extensibility to tailor processing operations to tune image recognition modeling for specific image classes/categories that are associated with domain-specific traffic; reduction in latency during real-time image recognition processing based on exposure image recognition models that are tuned for domain-specific traffic; improved processing efficiency for computing devices executing image recognition processing through an ability to tune image recognition modeling to be run efficiently on computer processing units (CPUs) without requiring devices to have graphics processing units (GPUs); improving usability of applications/services through automated image recognition processing and an ability to automatically provide suggestions associated with image content for use by applications/services; and improving graphical user interfaces (GUIs) of applications/services to surface results of image recognition modeling described herein, among other technical advantages.

Figure 1:
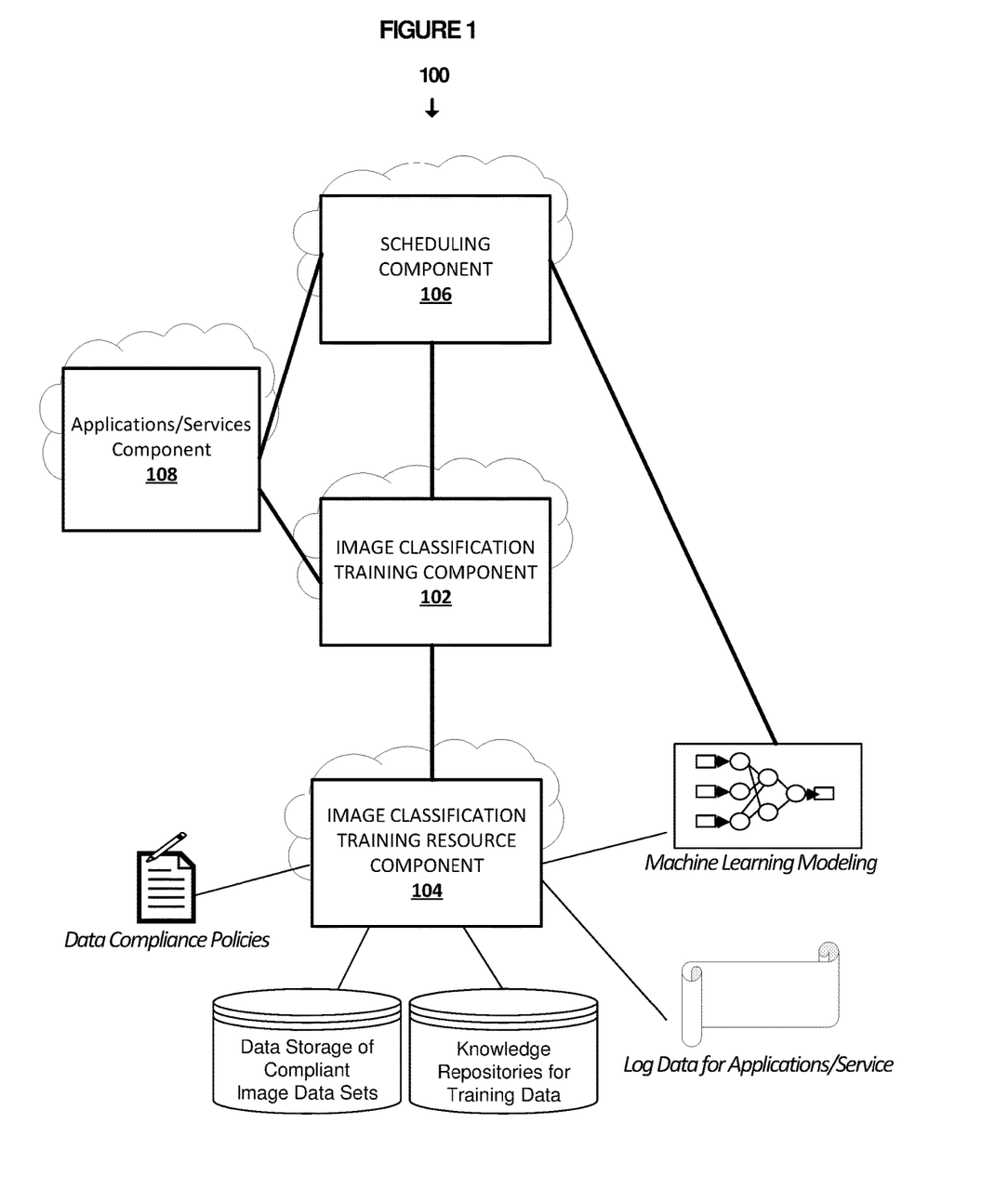
FIG. 1 illustrates an exemplary process flow providing exemplary components usable for training of image recognition modeling, with which aspects of the present disclosure may be practiced.

FIG. 1 illustrates an exemplary process flow 100 providing exemplary components usable for training of image recognition modeling e, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services described herein. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In the illustration of process flow 100, there are process flow steps that are aimed at emphasizing non-limiting examples of interaction between components shown in FIG. 1. Process flow between components may be altered without departing from the spirit of the present disclosure. Process flow 100 comprises components of an image recognition pipeline that creates a system of components (hardware and/or software) configured to manage image recognition processing for image content accessed through an application/service. Process flow 100 comprises an image classification training component 102, a scheduling component 106, an image classification training resource component 104, and an applications/services component 108.

The image classification training component 102 is configured to train and tune image recognition modeling to handle domain-specific traffic of an application/service (or suite of applications/services). In doing so, the image classification training component 102 interfaces with the image classification training resource component 104, the scheduling component 106, and the applications/services component 108 as subsequently described. A training focus of the image classification training component 102 is to train and tune image recognition classifiers that enable achievement of real-time image classification without requiring GPU support. In other words, accurate, real-time image classification is achieved using CPU support.

As identified in the foregoing description, data compliance requirements add complication for training image recognition classifiers in cases where user image content and/or associated image embeddings cannot be logged. To satisfy data compliance requirements, training of image recognition classifiers by the image classification training component 102 is an iterative process that comprises online training and tuning, offline training and tuning and/or a combination thereof. In each iteration, data compliance requirements associated with usage of image content are satisfied to achieve training of an image recognition classifier. For instance, the image classification training component 102 is configured to utilize image content and/or image embeddings from the image content for online training evaluation that does not violate data compliance requirements for logging of such image content. Results of the online image classification, including labeling of the image content, are propagated for subsequent offline training evaluation, thereby avoiding any violation of data compliance requirements for logging of image content. In doing so, the image classification training component 102 is configured to detect that data compliance requirements are satisfied at times in which the online training evaluation is occurring. For instance, the image classification training component 102 is configured to continuously detect that image content is being utilized in an active online session of an application/service. In instances where the image content is no longer being utilized in an active online session of an application/service, the image classification training component 102 is configured to stop usage of the image content (and/or image embeddings) in any manner that violates data compliance requirements. In such instances, results from processing that occurred while data compliance requirements were satisfied, may be propagated for subsequent training evaluation.

The image classification training component 102 employs machine learning modeling for building and training image recognition classifiers. General processing operations for building and training machine learning modeling are known to one skilled in the field of art. Examples described herein further what is generally known in the field of art. In some examples, the image classification training component 102 acquires access to pretrained models for general image classification as a starting point for building image recognition modeling that is tuned for domain-specific traffic. In other cases, image recognition modeling is built from scratch and trained based on both general image data and domain-specific image data.

In order to train image recognition classifiers, the image classification training component 102 interfaces with an image classification training resource component 104. The image classification training resource component 104 is configured to provide access to a plurality of resources to aid training of image recognition modeling including training of image recognition classifiers for domain-specific image classification. Among other non-limiting examples, resources may be resources provided through a data platform (e.g., Microsoft® data platform) including applications/services; resources accessed through third-party applications/services; and resources accessed over network connection. Examples of training resources comprise but are not limited to: data compliance policies for management of content (e.g., user image content); data storage(s) of compliant image data sets for training; knowledge repositories of training data for building, training, tuning image recognition modeling; log data for applications/services (e.g., applications/services of a data platform that is logged in compliance with data compliance requirements); and machine learning modeling configured for execution of image recognition modeling/image classification, among other examples. Such resources may be accessed via network connection by means as known to one skilled in the field of art. For instance, databases for management of data compliance policies and regulations may be continuously updated and accessed to provide access to the most up-to-date data compliance requirements.

The image classification training component 102, the image classification training resource component 104, as well as the subsequently described scheduling component 106 interface with an applications/services component 108. The applications/services component 108 is configured to provide access to applications/services such as applications/services in which image recognition modeling can be trained and tuned for image classification. That is, image recognition modeling may be trained and tuned to classify domain-specific data traffic for different applications/services. Exemplary applications/services may be any type of programmed software. A non-limiting example of an application/service is a productivity application/service that is configured for execution to enable users to complete tasks on a computing device, where exemplary productivity services may be configured to work with image content in different application-specific scenarios. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/services, directory applications/services, mapping applications/services, calendaring applications/services, electronic payment applications/services, file storage and synchronization applications/services, digital data storage or distributed data storage applications/services, web conferencing applications/services, call communication applications/services, camera applications/services, audio/video applications/services, language understanding applications/services, bot framework applications/services, networking applications/service, and social networking applications/services, among other examples. In some examples, an exemplary productivity application/service may be a component of a data platform providing a suite of productivity applications/services. A data platform suite is configured to providing access to a plurality of applications/services, thereby enabling cross-application/service usage to enhance functionality of a specific application/service at run-time. As productivity features may span a wide variety of functionality, contextual relevance evaluation is configured to identify specific productivity features that are most relevant to a context in which a user is utilizing image content. Moreover, specific application/services as well as data platform suites may be configured to interface with other non-proprietary application/services (e.g., third-party applications/services) to extend functionality including productivity feature suggestion and implementation.

Turning back to processing by the image classification training component 102, a base layer of training is executed to prepare an image recognition for domain-specific training. Image recognition classifiers can be specifically trained to identify single image classification classes and/or mixed image classification classes through iterative training processing. In one example, the image classification training component 102 executes an initial training iteration of an image recognition classifier using one or more public image data sets that comprises publicly available images (e.g., open source image data sets, purchased commercial image data sets) and one or more search engine image data sets that comprises image content identified based on searching keywords in search engines. The image content used in the public image data sets and the search engine image data sets are image content that is compliant with data compliance requirements for utilizing the image content for training purposes. For instance, the image content is compliant to be logged, stored, and utilized for training processing. The public image data sets and the search engine image data sets contains levels of biases based on the application/service contexts in which they were collected. Thus, further training is needed to minimize this bias and tune an image recognition classifier for domain-specific image classification. Furthermore, the image classification training component 102 may utilize image content of the public image data sets and/or search engine image data sets for purposes including to construction negative samples of a final training dataset.

The image classification training component 102 further executes one or more iterations of online image classification training. Online image classification training comprises processing operations that utilize user image content, used in an online session of an application/service, for image recognition classifier training. In using user image content, the image classification training component 102 is configured to generate labeling for the user image content in a manner that satisfies data compliance requirements identifying how the user image content may be utilized. Processing operations for doing so may comprise: identifying relevant data compliance policies and regulations; determining processing rules, that when applied, can make sure that data compliance requirements are satisfied; enforcing the determined processing rules while utilizing user image content; and verifying that data compliance requirements are not subsequently violated at a later point in time (e.g., (e.g., non-compliant image content that does not satisfy data compliance requirements is not logged/stored/used inappropriately).

Processing operations of the present disclosure execute online image classification training on the image content and propagate results of that online training evaluation (including labeling of the image content) for subsequent offline training evaluation in a manner that does not violate data compliance requirements. For instance, the image classification training component 102 is configured to continuously detect that image content is being utilized in an active online session of an application/service. In instances where the image content is no longer being utilized in an active online session of an application/service, the image classification training component 102 is configured to stop usage of the image content (and/or image embeddings) in any manner that violates data compliance requirements. In such instances, results from processing that occurred while data compliance requirements were satisfied, may be propagated for subsequent training evaluation.

As identified above, the image classification training component 102 is configured to execute processing operations to generate image classification results for image content that is utilized in an active online session of an application/service. Image classification results may comprise image embeddings associated with image content and/or classification labeling for the image content across any of a plurality of different image categories, as known to one skilled in the field of art. The image embeddings and/or labeling is used to train subsequent iterations of an image recognition classifier, additional image recognition classifiers and further improve accuracy and efficiency during real-time (or near real-time) image classification processing. In order to generate labeling for image content (e.g., user image content), the image classification training component 102 is configured to evaluate image content in an active online session of an application/service through any of: image embedding analysis; rendering of a table/chart of attributes of image content; screen-copy evaluation of the image content; cross-model analysis amongst image recognition modeling; and a combination thereof. During the online image analysis, image content is analyzed through means that may store data related to the image content in program memory while the user is online without logging that data for offline usage. When an online session is no longer active, the program memory may be wiped so that image content is no longer stored.

In one example, the image classification training component 102 executes processing operations for analyzing user image content from an application/service without actually storing the image content. For instance, a table/chart is rendered and populated for different attributes of the user image content that is used in an online session of an application/service without actually storing the image content. In one instance, image embeddings associated with the user image content may be parsed and analyzed to render a table/chart for the image content. Developers may define attributes for table/chart rendering, where the attributes may be specific to the type of application/service that is being evaluated (i.e., the domain) and the types of image content that are specific to that domain. That is, attributes evaluated may vary from application/service to application/service depending on the context that an application/service creates. General attributes for image content may attempt to define but are not limited to: the type of content; whether the content is content used in a foreground of an electronic document (e.g., a slide-based electronic document); a mode of capture of the image content; whether the image content is used in a background of an electronic document; whether specific classes of objects are detection in the image content; facial recognition detection in the image content; how the image content was added to an application/service; whether user feedback signals were detected for actions, through the application/service, related to the image content; whether users have commented on the image content or tagged other related content; entity identification related to the image content; image caption detection; pixel and/or block evaluation; and evaluation of any other known image classification features as known to one skilled in the field of art, among other examples.

In another example, the image classification training component 102 may further executes processing operations for a screen-copy of an application/service, which may be utilized to evaluate the image content while an active online session of an application/service is running. In further examples, image embeddings may also be identified from a screen-copy operation and used to assist with labeling of the image content. The image classification training component 102 may further execute cross-model evaluation, from training of other image recognition modeling and/or other types of machine learning modeling executed through a data platform, to assist with online image classification training. For instance, different image classifications can help identify differences between image content (e.g., a face image is not a logo image; a table image is likely to contain text content to be evaluated). In one instance, machine learning modeling of a data platform may analyze usage of user feedback signals, where logic is applied to compliantly track and evaluate actions received through an application/service to aid in image classification evaluation. For example, analysis of user actions through an application/service can aid in identifying whether image content is a screenshot/screen-copy image from another resource. In this way, identification of a screenshot/screen-copy image and associated data/metadata can be utilized to verify accuracy of a screen-copy taken from an application/service.

Analysis of image embeddings and generated labeling for image content may continuously be aggregated and used to train and tune an image recognition classifier. With aggregated image embeddings and image classification labeling, layers of image recognition modeling can be retrained to improve accuracy, precision, and efficiency in executing image classification processing of domain-specific traffic. Image classification labeling may be generated for single image classes as well as mixed image classes. Moreover, the image classification training component 102 may be configured to execute training techniques such as deep reinforcement learning that may be applied to conduct online training of an image recognition classifier. In some further examples, the image classification training component 102 is configured to determine optimal device configurations for executing online training analysis. For instance, processing operations for executed online training may have a limited amount of time to work with user image content based on strict data compliance requirements, where the image classification training component 102 is configured to select and apply device configurations that can execute training processing with a specific time period assuring that online training can be completed without violating data compliance requirements. Selection of device configurations can also assist with spreading a processing load for training operation so that CPUs can execute training processing without exclusively requiring GPU configurations for execution of training processing.

The image classification training component 102 further executes one or more iterations of offline image classification training. As identified in the foregoing description, results of online image classification training may be propagated to assist training of tuning of an image recognition classifier during iterations of offline image classification training, where image content data compliance requirements related to usage of image content may prevent image content of an application/service from being logged for offline evaluation. Offline image classification training may utilize results from the online image classification training to assist with training and tuning of an image recognition classifier. For instance, image embeddings, a rendered table/chart for image content, and/or generated labeling may be utilized to tune the image recognition classifier in offline training to generate image classification labels for single image classification classes and/or mixed image classification classes. Offline image classification training may utilize image sets including public image data sets and search engine image data sets as described in the foregoing description. Moreover, offline image classification training may comprise a collection of one or more vault image data sets that comprise compliant domain-specific image content that is utilized to train and tune an image recognition classifier. An exemplary vault image data set comprises user compliant slides (i.e., a data platform has a right to utilize image content from these slides for training purposes) based on data compliance requirements and/or user approval. The image classification training component 102 is configured to extract image content from the user compliant slides and use that extracted image content to train the image recognition classifier for domain-specific image content.

In executing offline image classification training, the image classification training component 102 is configured to utilize multiple different image data sets (e.g., amongst public image data sets, search engine image data sets, vault image data sets) for specific image classes and/or mixed image classes. Training processing comprises processing operations that find accuracy for specific image classes amongst the corpus of training image data. In one example, a confusion matrix is generated amongst identified image classes to assist with image recognition classifier training. This is helpful in domain-specific instances where it is not readily clear as to the exact percentage of each image class that is in the domain-specific data traffic.

Each image recognition classifier may be required to obtain a certain level of precision before getting uploaded to production. As such, iterations of online and offline training may be repeated to achieve levels of precision and accuracy for an image recognition classifier. During execution of iterations of training processing, the image classification training component 102 may execute machine learning modeling to assure that threshold requirements of accuracy/precision are achieved. This may comprise executing processing that include but is not limited to: ranker scoring; AB analysis; follow-up algorithmic analysis that acts on feedback signals detected from application/service usage, and any other machine learning ranking processing as known to one skilled in the field of art. Once a threshold level of accuracy/precision is achieved through the iterative training, the image classification training component 102 is configured to expose an image recognition classifier for production. This enables specific image recognition modeling to be used for real-time (or near real-time) evaluation of domain-specific data traffic. In doing so, the image classification training component 102 interface with the scheduling component 106, which may be utilized to select image recognition modeling to apply in domain-specific application/service scenarios.

The scheduling component 106 is a component of an image recognition pipeline that manages application of image recognition modeling to evaluate domain-specific data traffic of an application/serviced. An example of a data platform is Microsoft® Office365®. Traditionally, there is limited support for Microsoft® Windows® server operating system (OS) when it comes to integration of image recognition models with existing server infrastructure. Many image recognition models do not support the Window server OS from open source code. To overcome such technical challenges, the scheduling component 106 is configured to provide data to enable any server environment of an application platform to interface with any type of image recognition framework including deep learning frameworks.

The scheduling component 106 is configured to manage configuration file data for application/services that identifies tuned image recognition modeling which is ready for domain-specific application. The scheduling component 106 is configured to interface with a plurality of different applications/services, where different applications/services may have different processing requirements based on the type of tasks that are executing within specific applications/services. The scheduling component 106 selects which image recognition classifiers to employ for evaluation of domain-specific data traffic based stored configuration file data (e.g., indicating a type of application/service that is being evaluated) and results of training processing that identifies tuned image recognition classifiers for image classification processing. Non-limiting examples of application-specific parameters for image recognition processing comprises but are not limited to: identification of specific applications/services; identification of tasks that involve usage of image content through applications/services; application-specific time requirements associated with returning timely suggestions to a user through an application/service; application-specific signal data that may be utilized to assist with generation of suggestions for image content and proactive surfacing of suggestions; classification of type of application/service; and priority preferences for execution of specific image recognition models in application-specific scenarios, among other examples. Configuration data for multiple applications/services may be stored in a single configuration file or multiple configuration files to assist processing efficiency during run-time operation.

The scheduling component 106 identifies incoming image content through interaction with the applications/services component 108 and optimizes application of image recognition classifiers for image classification processing of the image content based on an application-specific scenario in which the image content is being utilized. In one example, the scheduling component 106 is configured to group applicable image recognition classifiers into batches for run-time execution. Selection of image recognition modeling for batch division may be based on analysis of the configuration data (e.g., application-specific parameters, priorities of image recognition classifiers). In one example, latency determinations in execution of image recognition classification is utilized to segregate image recognition models into batches. For instance, a threshold latency requirement (e.g., results returned in less than 10 milliseconds; results returned in less than 30 milliseconds; results returned in less than 50 milliseconds) may be create that separates application of image recognition classifiers into batches. As an example, deeper learning models may take more time to run where a scheduling component 106 may selectively determine when such modeling should be executed.

The scheduling component 106 may further be configured to select a device configuration to execute respective batches of image recognition modeling. Device configurations may be selected based on evaluation of configuration data for the image recognition pipeline so that image recognition processing is optimized for application-specific scenarios. Device configurations may be dynamically adapted to account for infrastructure resources of a data platform. For example, the scheduling component 106 may be simultaneously handling image classification processing for a plurality of different applications/services, where computational resources are required to be spread out across available devices to maintain efficient processing. In doing so, the scheduling component 106 is configured to implement intra-worker parallelism, where one machine (worker) can serve multiple deep models at the same time together with other image data analyzers. For example, image recognition models in a specified batch may be executed using the same device/machine. This can aid processing efficiency where models, evaluating different attributes can be grouped together and run on the same device for a comprehensive and efficient processing result. The scheduling component 106 may be further manages available resources and processing workloads to achieve optimal device configuration for execution of image classification processing. In examples where there exists a larger amount of image recognition models that are to be served by one machine, that machine becomes slow as it is bogged down with a heavier workload. Hence, the scheduling component 106 is configured to dynamically implement concepts of inter-worker parallelism, where processing loads for the deep learning models and image analysis service (IAS) analyzers can be split and spread across multiple machines for inter-worker parallel computing. The split is dynamically controlled by the scheduling component 106 and can be adjusted without checking code and build data for the scheduling component 106.

Additionally, the scheduling component 106 is further configured to analyze classification recognition results (e.g., aggregate image recognition results) from one or more batches of image recognition models. In doing so, the scheduling component 106 may implement machine learning modeling that is trained and configured to evaluate classification results and rank applicable image classification results for application-specific context. For example, image classification results related to features such as object identification, size of the image, shape of the image, facial recognition, etc., may be relevant in different application-specific scenarios to enable the scheduling component 106 to interface with applications/services for the generation of suggestions based on the image content. Ranking processing and associated machine learning modeling is known to one skilled in the field of art. Application-specific parameters (e.g., identified in the configuration data) and/or signal data received from an application/service may be utilized to generate application-specific image recognition suggestions. In some alternative examples, the scheduling component 106 is configured to propagate the image classification results directly to the applications/services component 108 to enable an application/service to take charge with processing for creation of contextual suggestions based on results of image classification processing.

Figure 2:
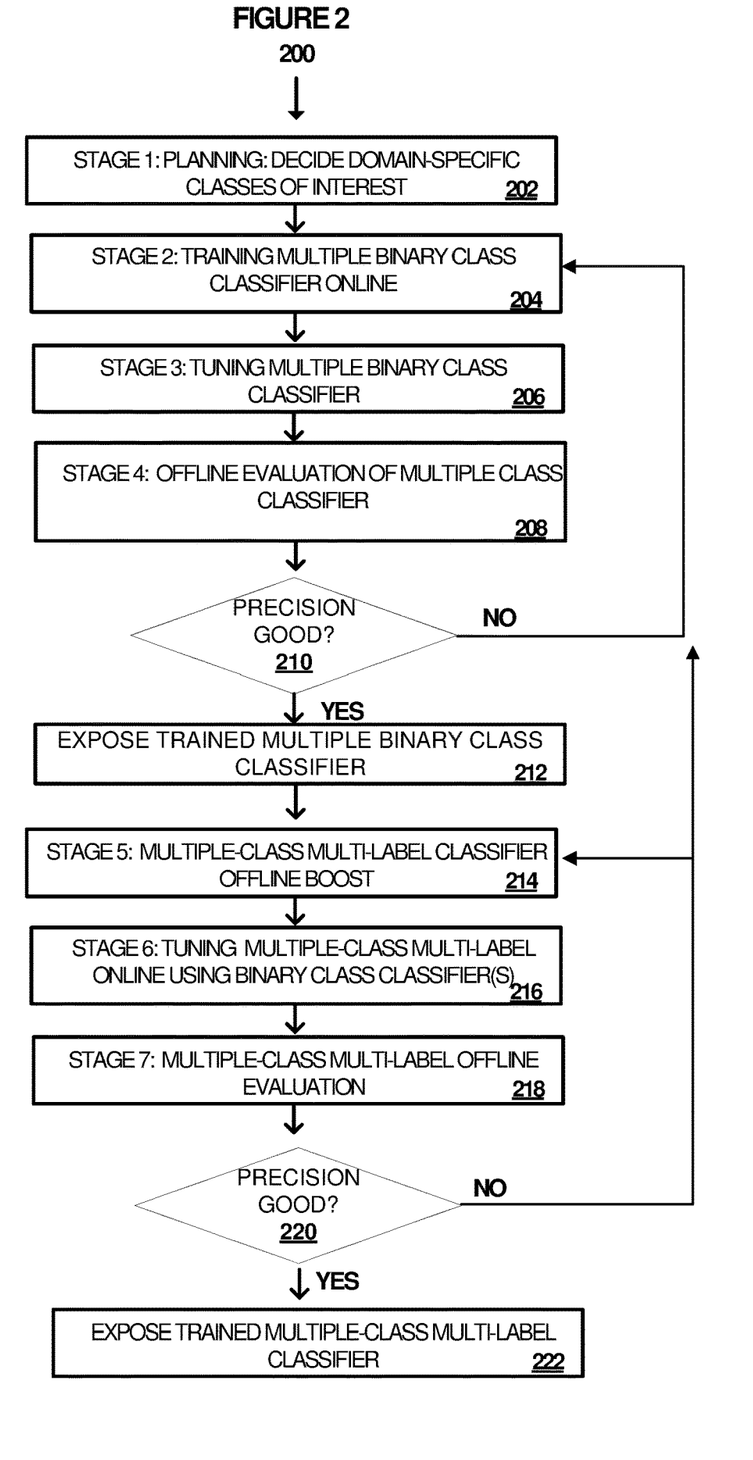
FIG. 2 illustrates an exemplary method providing stages for training of image recognition classifiers that are used for image classification processing, with which aspects of the present disclosure may be practiced.

FIG. 2 illustrates an exemplary method 200 providing stages for training of image recognition classifiers that are used for image classification processing, with which aspects of the present disclosure may be practiced. Processing operations described in method 200 may be executed by components described in process flow 100 (FIG. 1) including an image classification training component 102, where the detailed description in process flow 100 supports and supplements the recited processing operations in respective methods. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 4:
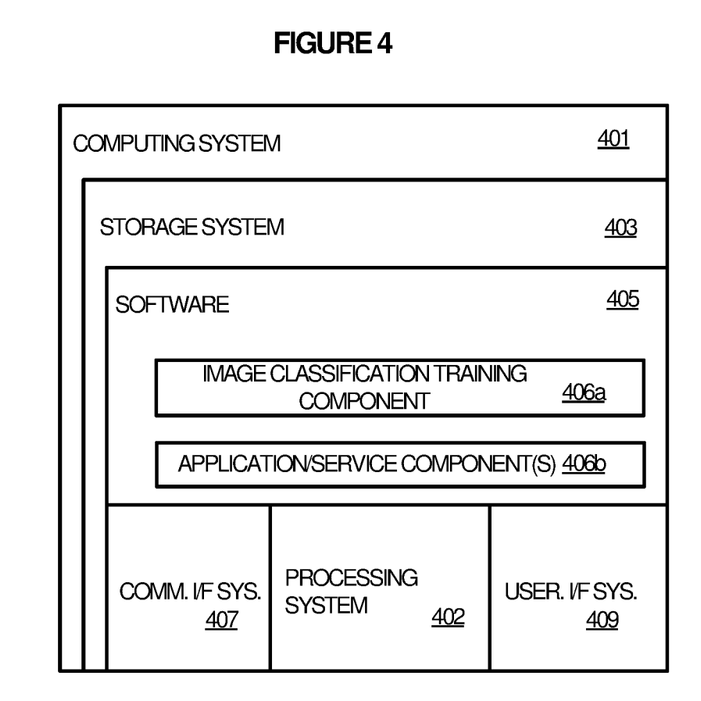
FIG. 4 illustrates a computing system suitable for implementing processing operations described herein related to management of an image classification training component with which aspects of the present disclosure may be practiced.

As an example, method 200 may be executed across an exemplary computing system (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where a first stage of training of domain-specific image recognition classifier commences. Processing operation 202 comprises execution of processing operations that constitute a planning determination evaluating domain-specific data traffic to determine domain-specific classes of interest for training of image recognition classifiers. In real-time, domain-specific traffic is typically unknown traffic for image classification purposes. As such, an image recognition classifier may be trained on specific classes of interest for a sampling of content associated with a specific application/service. Processing operation 202 may comprise parsing and collection operations to obtain feedback from different data resources to generate classes of interest for domain-specific data traffic. Data resources for feedback comprise but are not limited to: user feedback (e.g., users of an application/service, project managers; production team; developers) and inspection of vault data image sets that comprise domain-specific image content from an application/service, among other examples.

Flow of method 200 proceeds to a second stage of training of domain-specific image recognition classifier. At processing operation 204, a training stage trains a multiple binary class classifier through online image classification training. While a multiple binary class classifier is referenced herein, it is to be understood that any type of classifier (e.g., binary classifier) can be trained without departing from the spirit of the present disclosure. Online image classification training comprises execution of processing operations described in the foregoing description. For example, training data may comprise publicly available image data sets, search engine data sets, vault image data sets, etc., where training data is correlated with real-time domain-specific traffic for an application/service. Image content identified in an active online session of an application/service may be evaluated using processing operations previously described. In further examples, training techniques that are applicable for online image classification training comprise but are not limited to: modeling for targeting high precision/low recall; weighted evaluations for image content classification (e.g., large weight loss for wrong training samples); management of a confusion matrix (e.g., to keep track of potential confusion amongst different image classes); and implication of threshold control to execute a final predictive determination as to whether image content is classified in a specific image class/mixed image class, among other examples.

Once an iteration of training occurs for an image recognition classifier, flow of method 200 proceeds to processing operation 206, where a third stage of training commences. At processing operation 206, the multiple binary class classifier is tuned. Tuning operations identify a best version of an image recognition classifier by running various modeling evaluations that test a range of configurable parameters set for a data set. The configurable parameters are tunable, with ranges of values, to optimize an image recognition classifier for real-time image classification processing. In doing so, configurable parameters may be set and/or adjusted to obtain a threshold level of accuracy/precision and/or efficiency for image recognition classification. That is, signal data may be correlated and evaluated to validate or debunk an image classification for image content. In cases where the image recognition classifier is not accurate enough, further training and tuning may be required.

Non-limiting examples of configurable parameters for tuning comprise but are not limited to: a threshold level for precision/accuracy that needs to be realized (as set by developers); parameters for algorithmic evaluation of image content such as image resizing requirements and image quality requirements; and types (and/or amounts) of user signal data collected for tuning evaluation, among other examples. In one example, processing operation 206 comprises tuning the multiple binary class classifier online based on online image classification training. Processing operation 206 may comprise collecting and evaluating signal data collected from various resources including but not limited to: scoring from other image recognition classifiers; user interaction/feedback signals; and signal data collected from other machine learning modeling. For instance, useful signals that may be collected from users to verify results of an image recognition classifier comprise but are not limited to: whether image content is selected from a specific category of content in the application/service or another application/service; whether the image content is a screen-shot image; and whether table content, chart, other specific types of content, etc., is inserted/pasted in an application/service, among other examples. Other types of machine learning modeling may be useful to verify detection of specific types of image content (e.g., logos, captions, textboxes) as well as check overlap percentages amongst image classification classes, among other examples.

Flow of method 200 proceeds to a fourth stage of training of domain-specific image recognition classifier. At processing operation 208, a training stage trains the binary class classifier (e.g., multiple binary class classifier) through offline image classification training. Offline image classification training comprises execution of processing operations described in the foregoing description. In one example, new batches of training data may be introduced to train an image recognition classifier at the offline image classification training stage, where new batches of data may comprise any of: publicly available image data sets, search engine data sets, vault image data sets, etc. For instance, a vault image data set comprising domain-specific image data is introduced to train an image recognition classifier before/after online image classification training. Offline image classification training evaluation executes processing operations for: identifying image content on a per class basis; calculating precision thresholds and or recall parameters for classifying image content in a specific image classification class; and identifying confusion between image classification classes, among other examples.

Flow of method 200 may proceed to decision operation 210, where it is determined whether a precision threshold is satisfied based on the online image classification training and the offline image classification training. In examples where a precision threshold is not satisfied based on the previous iterations of training, flow of decision operation 210 branches NO and processing returns to processing operation 204. In that case, the image recognition classifier may be retrained with more data/different training parameters to reduce confusion amongst image classification classes. In examples where a precision threshold is satisfied based on previous iterations of training, flow of decision operation 210 branches YES and processing of method 200 proceeds to processing operation 212. At processing operation 212, the tuned binary class classifier (e.g., multiple binary class classifier) is exposed for image classification processing. Once the tuned image recognition classifier is exposed (processing operation 212), the scheduling component 106 (of FIG. 1) may select and apply the tuned image recognition classifier for real-time processing of domain-specific image content of an application/service.

In further examples, results from the tuned image recognition classifier are further propagated for subsequent image recognition classifier training. For example, additional image recognition classifiers, including larger and more complex image recognitions classifiers, may be further trained based on results of the training of the binary class classifier. In one example, training of a multiple-class multi-label classifier is boosted (stage 5; processing operation 214) for training and tuning of the multiple-class multi-label classifier. While examples described herein reference a multiple-class multi-label classifier, it is to be understood that the present disclosure pertains to any type of deeper learning image recognition modeling that comprises evaluation of more than one image classification class. In one non-limiting example, the multiple-class multi-label classifier is boosted through offline image classification training processing as previously described with respect to training of a binary class classifier. For example, image data sets, including compliant domain-specific image data is added to a corpus of training data for the multiple-class multi-label classifier.

Additional processing operations for training of the multiple-class multi-label classifier are executed in processing operation 216 (stage 6), where the multiple-class multi-label classifier is tuned online and offline (processing operation 218; stage 7) using results from one or more binary class classifier(s) that were previously tuned. In doing so, the multiple-class multi-label classifier is trained and tuned to evaluate multiple image classification classes using a single classifier in both online and offline contexts similar to what is previously described with respect to the binary class classifier.

Flow of method 200 may proceed to decision operation 220, where it is determined whether a precision threshold is satisfied for the multiple-class multi-label classifier based on the online image classification training and the offline image classification training. In examples where a precision threshold is not satisfied based on the previous iterations of training, flow of decision operation 220 branches NO and processing returns to processing operation 214. In some alternative examples of method 200, re-training of the multiple-class multi-label classifier may require retraining of one or more binary class classifiers. In such examples, processing flow may return back to processing operation 204, where additional training is executed for a binary class classifier. In examples where a precision threshold is satisfied based on previous iterations of training, flow of decision operation 220 branches YES and processing of method 200 proceeds to processing operation 222. At processing operation 222, the tuned multiple-class multi-label classifier is exposed for image classification processing. Once the tuned multiple-class multi-label classifier is exposed (processing operation 222), the scheduling component 106 (of FIG. 1) may select and apply the tuned multiple-class multi-label classifier for real-time processing of domain-specific image content of an application/service.

Figure 3A:
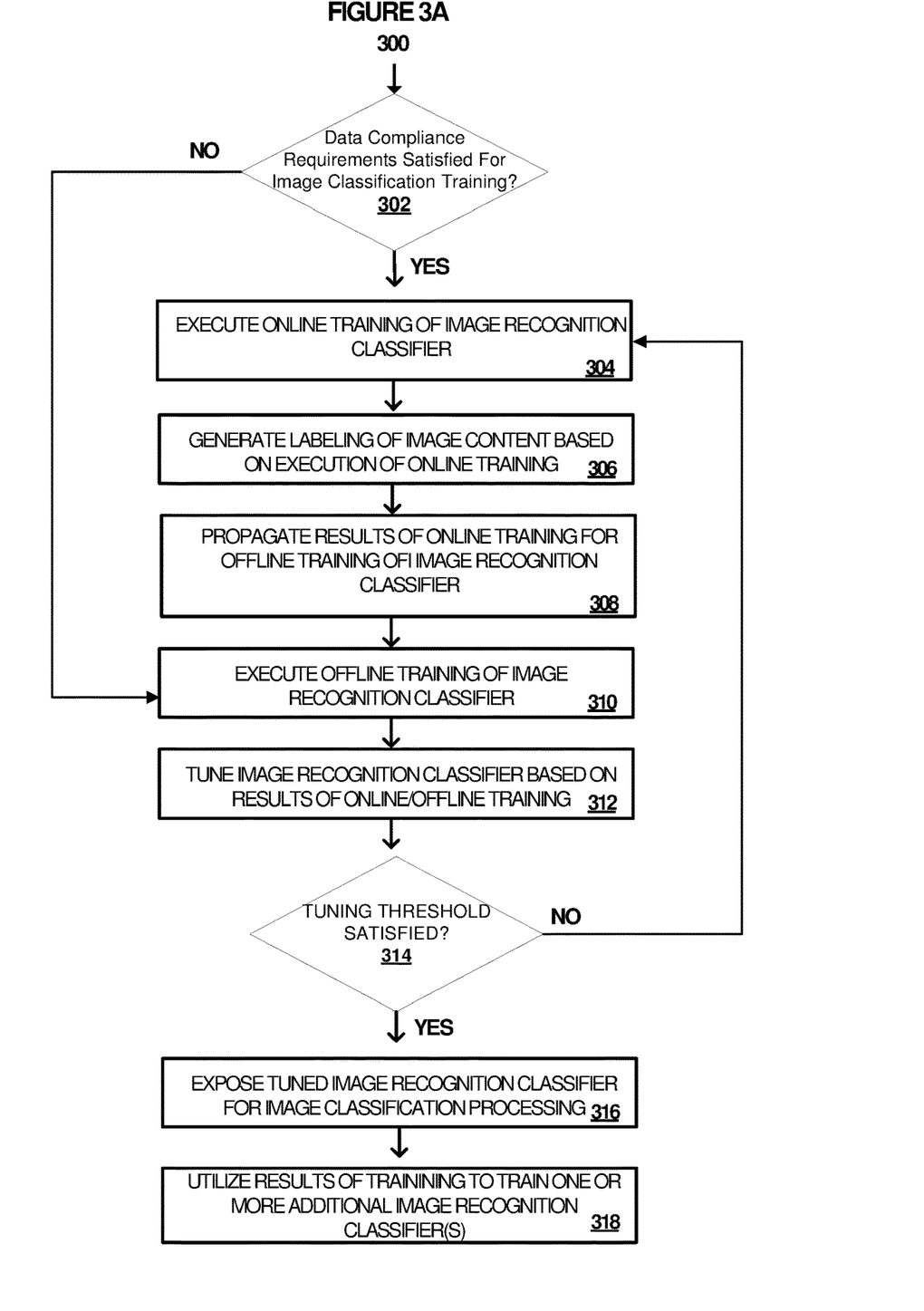
FIG. 3A illustrates an exemplary method providing processing operations related to image recognition classifier training, with which aspects of the present disclosure may be practiced.

FIG. 3A illustrates an exemplary method 300 providing processing operations related to image recognition classifier training, with which aspects of the present disclosure may be practiced. Processing operations described in method 300 may be executed by components described in process flow 100 (FIG. 1), where the detailed description in process flow 100 supports and supplements the recited processing operations in respective methods. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure. Additionally, processing operations described in method 200 (FIG. 2) may further be incorporated as processing operations executed in method 300 (FIG. 3A).

As an example, method 300 may be executed across an exemplary computing system (or computing systems) as described in the description of FIG. 4. Exemplary components, described in method 300, may be hardware and/or software components, which are programmed to execute processing operations described herein. Operations performed in method 300 may correspond to operations executed by a system and/or service that execute computer programs, software agents, intelligent bots, application programming interfaces (APIs), neural networks and/or machine-learning processing, among other examples. In some examples, processing operations described in method 300 may be executed by one or more applications/services associated with a web service that has access to a plurality of application/services, devices, knowledge resources, etc. In one instance, processing operations described in method 300 may be implemented by one or more components connected over a distributed network.

Method 300 begins at decision operation 302, where it is determined whether data compliance requirements are satisfied for use of image content for image classification training. Decision operation 302 may comprise determining whether image content is included in an active online session of an application/service. In one example, an application or service is a digital presentation application or service, and the image content is included in a slide-based electronic document of the digital presentation application or service that is actively being accessed by a user.

In cases where data compliance requirements are satisfied (e.g., the image content is being utilized in an active online session of an application/service), the image content may be utilized in ways previously described to execute online image classification training of an image recognition classifier. Flow of decision operation 302 branches YES and processing of method 300 proceeds to operation 304, where online training of an image recognition classifier is executed. Processing operations related to online image classification training have been described in the foregoing description including the description of process flow 100 (FIG. 1) and method 200 (FIG. 2). Non-limiting examples of an image recognition classifier comprise but are not limited to a multiple binary class classifier and a multiple-class multi-label classifier. In examples where data compliance requirements are not satisfied for usage of the image content for image classification training, flow of decision operation 302 branches NO and processing of method 300 proceeds to processing operation 310. At processing operation 310, offline training of an image recognition classifier is executed. For instance, offline processing may utilize compliant image content and associated data to execute training of an image recognition classifier.

At processing operation 306, image classification labeling is generated for the domain-specific image content. The image classification labeling is generated (processing operation 306) based on results of the online training of the image recognition classifier. That is, image classification labeling may classify the image content into one or more image classification classes (or mixed classes) based on application of machine learning modeling that applies one or more image recognition classifiers to evaluate the image content and associated data. In some examples, labeling for the image content may be generated based on: an analysis of a rendered table/chart associated with analysis of the image content (and/or image embeddings associated with the image content); results of analysis of image embeddings associated with the image content; results of a screen-copy evaluation of the application/service that comprises the image content; results of cross-model analysis of signal data associated with usage of the image content through the application/service; and any combination thereof.

Following generation of image classification results from online image classification training processing, flow of method 300 proceeds to processing operation 308. At processing operation 308, results of online training for the image recognition classified are propagated for usage in offline training of the image recognition classifier. At processing operation 310, offline training of the image recognition classifier is executed. Processing operations related to offline image classification training have been described in the foregoing description including the description of process flow 100 (FIG. 1) and method 200 (FIG. 2). Following execution (processing operation 310) of the offline image classification training, flow of method 300 proceeds to processing operation 312.

At processing operation 312, the image recognition classifier is tuned based on results of the online image classification training and/or results of the offline image classification training. Processing operations for tuning of image recognition classifier have been described in the foregoing description including the description of process flow 100 (FIG. 1) and method 200 (FIG. 2). Flow of method 300 proceeds to decision operation 314, where the image recognition classifier is evaluated to determine if a tuning threshold is satisfied for exposure of the image recognition classifier for real-time image classification processing. Tuning thresholds may be set by developers and may vary without departing from the spirit of the present disclosure. Ideally, a highest level of accuracy and precision is to be achieved for analyzing domain-specific traffic (image content). In examples where a tuning threshold is not satisfied based on previous iterations of training processing, flow of decision operation 314 branches NO and processing of method 300 returns to processing operation 304 to begin further iterations of training processing. In examples where the tuning threshold is satisfied, flow of decision operation 314 branches YES and processing of method 300 proceeds to processing operation 316.

At processing operation 316, the tuned image recognition classifier is exposed for real-time image classification processing. Exposure (processing operation 316) may comprise an image classification training resource component interfacing with other processing components such as the scheduling component 106 (FIG. 1) and the applications/services component (108) to enable a tuned image recognition classifier to be selected for image classification processing during real-time application/service execution.

In further examples, flow of method 300 proceeds to processing operation 318, where results of the training of the image recognition classifier are utilized to train one or more additional image recognition classifiers. In one example, an image recognition classifier is a multiple binary class classifier, where training data may be propagated to train a multiple-class multi-label classifier.

Figure 3B:
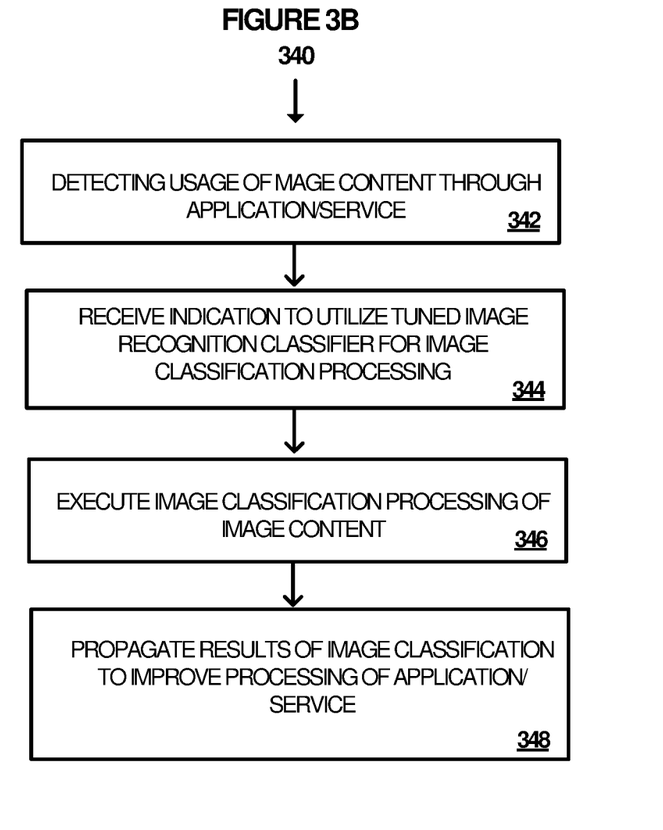
FIG. 3B illustrates an exemplary method related to utilization of one or more tuned image recognition classifiers during image classification processing, with which aspects of the present disclosure may be practiced.

FIG. 3B illustrates an exemplary method 340 related to utilization of one or more tuned image recognition classifiers during image classification processing, with which aspects of the present disclosure may be practiced. Processing operations described in method 340 may be executed by components described in process flow 100 (FIG. 1), where the detailed description in process flow 100 supports and supplements the recited processing operations in respective methods. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure. Additionally, processing operations described in method 200 (FIG. 2) may further be incorporated as processing operations executed in method 340 (FIG. 3B).

As an example, method 340 may be executed across an exemplary computing system (or computing systems) as described in the description of FIG. 4. Exemplary components, described in method 340, may be hardware and/or software components, which are programmed to execute processing operations described herein. Operations performed in method 340 may correspond to operations executed by a system and/or service that execute computer programs, software agents, intelligent bots, application programming interfaces (APIs), neural networks and/or machine-learning processing, among other examples. In some examples, processing operations described in method 340 may be executed by one or more applications/services associated with a web service that has access to a plurality of application/services, devices, knowledge resources, etc. In one instance, processing operations described in method 340 may be implemented by one or more components connected over a distributed network.

Method 340 begins at processing operation 342, where utilization of image content is detected through an application/service. Processing operation 342 may comprise detection usage of image content in real-time in an active online session of an application/service. As an example, image content may be subsequent image content added after training of an image recognition classifier has been completed and tuned image recognition modeling has been exposed for image classification processing of domain-specific.

In response to detection of usage of image content through an application/service, flow of method 340 may proceed to processing operation 344. At processing operation 344, an indication is received to utilize a tuned image recognition classifier for image classification processing. In one example, an indication may be provided by a scheduling component 106 (FIG. 1) that selects an image recognition classifier for real-time image classification processing. In another example, an indication may be provided by the applications/services component (108) based on usage of image content through an application/service. An image classification training component 102 (FIG. 1) or the scheduling component 106 (FIG. 1) may receive the indication depending on a component interaction scenario. In one instance, the scheduling component 106 may execute processing operations to select, from a plurality of exposed image recognition classifiers, the image recognition classifier for execution of image classification processing for a specific application/service scenario. In another example, an applications/services component 108 (FIG. 1) may select the image recognition classifier for execution of image classification processing based on previous exposure of the image recognition classifier, by the image classification training component 102 (FIG. 1) and programmed operation identified by the scheduling component 106. The scheduling component 106 may manage programmed operation based on continuous evaluation related to availability of exposed image recognition classifiers.

At processing operation 346, image classification processing is executed on the image content. Execution (processing operation 346) of image classification processing may comprise utilizing one or more tuned image recognition classifiers/image recognition models to execution image classification on the image content. Examples of processing operations executed for the image classification processing are similar to those described during training of an image recognition classifier as described in the foregoing description.

Results of the image classification processing may be propagated (processing operation 348) for subsequent processing that utilizes the image classification processing results to improve operation of an application/service. In one example, image classification processing results may be utilized to generate contextual suggestions through an application/service. Contextual suggestions may be generated by an applications/services component 108 (FIG. 1), a scheduling component 106 (FIG. 1) or a combination thereof. Contextual suggestions may be surfaced through a GUI of an application/service to improve processing of the application/service. In such instances, a GUI of an application/service may be adapted to accommodate for the generation and presentation of domain-specific contextual suggestions. It is to be understood that generated image classification results may be used for other purposes without departing from the spirit of the present disclosure.

FIG. 4 illustrates a computing system suitable for implementing processing operations described herein related to management of an image classification training component, with which aspects of the present disclosure may be practiced. Computing system 401, which is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, portable electronic devices, smart televisions, smart watches, and other wearable devices, as well as any variation or combination thereof.

Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service, or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components (e.g., 406a and 406b) that are configured as components for the image classification training component 406a and application/service components 406b (e.g., application platform, productivity application/service components). Examples of such components, including executable processing operations, have been described in the foregoing description. In some examples, computing system 401 may be a computing device that a user utilizes to access content and/or connect to an electronic meeting. Computing system 401 may be configured for provision of an adapted user interface, that is improved over traditional user interfaces, where a user interface may be tailored to enable proactive suggestions for sharing of meeting content as described herein. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing software components, hardware components or a combination thereof. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized implement an exemplary image classification training component 406a and/or other application/service components 406b, as described herein. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), Web Socket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
executing online training of an image recognition classifier based on a plurality of image content that is accessed through a cloud-based service, wherein the executing the online training comprises:
determining that data privacy compliance requirements are satisfied for usage of a first image content of the plurality of image content during a first time period during the online training and not satisfied for usage of the first image content during a second time period during the online training, and
using the first image content for the online training during the first time period and not during the second time period;

tuning the image recognition classifier based at least in part on results of the online training of the image recognition classifier; and exposing the tuned image recognition classifier for image classification processing during execution of the cloud-based service.

2. The method of claim 1, wherein the determining that the data privacy compliance requirements are satisfied for the first image content comprises continuously detecting that the first image content is being utilized in an active online session of an application.

3. The method of claim 1, further comprising:
executing an initial training iteration of the image recognition classifier using one or more public image data sets comprising publicly available images and one or more search engine image data sets comprising image content identified using search keywords in a search engine.

4. The method of claim 1, further comprising:
generating labeling for the plurality of image content, wherein the labeling satisfies the data privacy compliance requirements; and
executing offline training of the image recognition classifier using the labeling.

5. The method of claim 1, further comprising:
generating a chart populated with attributes of the plurality of image content without storing the plurality of image content to comply with the data privacy compliance requirements; and
executing offline training of the image recognition classifier using the chart.

6. The method of claim 1, further comprising:
selecting and applying device configurations identified to ensure the online training is executed within a specific time period to complete without violating the data privacy compliance requirements.

7. The method of claim 1, further comprising:
executing offline training of the image recognition classifier using multiple different image data sets.

8. The method of claim 1, further comprising:
executing offline training of the image recognition classifier;
determining a precision of the image recognition classifier; and
repeating the executing the online training, the executing the offline training, and the determining the precision until the precision exceeds a threshold precision.

9. The method of claim 1, wherein the image recognition classifier is tuned to evaluate domain-specific traffic associated with the cloud-based service.

10. A system comprising:
at least one processor; and
a memory, operatively connected with the at least one processor, having stored thereon instructions that, when executed by the at least one processor, causes the at least one processor to:
execute online training of an image recognition classifier based on a plurality of image content that is accessed through a cloud-based service, wherein the instructions to execute the online training comprises further instructions that, when executed by the at least one processor, causes the at least one processor to:
determine that data privacy compliance requirements are satisfied for usage of a first image content of the plurality of image content during a first time period during the online training and not satisfied for usage of the first image content during a second time period during the online training, and use the first image content for the online training during the first time period and not during the second time period;
tune the image recognition classifier based at least in part on results of the online training of the image recognition classifier; and
expose the tuned image recognition classifier for image classification processing during execution of the cloud-based service.

11. The system of claim 10, wherein the instructions to determine that the data privacy compliance requirements are satisfied comprise further instructions that, when executed by the at least one processor, causes the at least one processor to:
continuously detect that the first image content is being utilized in an active online session of an application.

12. The system of claim 10, wherein the instructions comprise further instructions that, when executed by the at least one processor, causes the at least one processor to:
execute an initial training iteration of the image recognition classifier using one or more public image data sets comprising publicly available images and one or more search engine image data sets comprising image content identified using search keywords in a search engine.

13. The system of claim 10, wherein the instructions comprise further instructions that, when executed by the at least one processor, causes the at least one processor to:
generate labeling for the plurality of image content, wherein the labeling satisfies the data privacy compliance requirements; and
execute offline training of the image recognition classifier using the labeling.

14. The system of claim 10, wherein the instructions comprise further instructions that, when executed by the at least one processor, causes the at least one processor to:
generate a chart populated with attributes of the plurality of image content without storing the plurality of image content to comply with the data privacy compliance requirements; and
execute offline training of the image recognition classifier using the chart.

15. The system of claim 10, wherein the instructions comprise further instructions that, when executed by the at least one processor, causes the at least one processor to:
select and apply device configurations identified to ensure the online training is executed within a specific time period to complete without violating the data privacy compliance requirements.

16. The system of claim 10, wherein the instructions comprise further instructions that, when executed by the at least one processor, causes the at least one processor to:
execute offline training of the image recognition classifier using multiple different image data sets.

17. The system of claim 10, wherein the instructions comprise further instructions that, when executed by the at least one processor, causes the at least one processor to:
execute offline training of the image recognition classifier;
determine a precision of the image recognition classifier; and
repeat the execute the online training, the execute the offline training, and the determine the precision until the precision exceeds a threshold precision.

18. The system of claim 10, wherein the image recognition classifier is tuned to evaluate domain-specific traffic associated with the cloud-based service.

19. A computer-readable storage device storing instructions that, upon execution by at least one processor, causes the at least one processor to:
- execute online training of an image recognition classifier based on a plurality of image content that is accessed through a cloud-based service, wherein the instructions to execute the online training comprise further instructions that, upon execution by the at least one processor, causes the at least one processor to:
  - determine that data privacy compliance requirements are satisfied for usage of a first image content of the plurality of image content during a first time period during the online training and not satisfied for usage of the first image content during a second time period during the online training, and
  - use the first image content for the online training during the first time period and not during the second time period;
- tune the image recognition classifier based at least in part on results of the online training of the image recognition classifier; and
- expose the tuned image recognition classifier for image classification processing during execution of the cloud-based service.

20. The computer-readable storage device of claim 19, wherein the instructions to determine that the data privacy compliance requirements are satisfied comprise further instructions that, upon execution by the at least one processor, causes the at least one processor to:
- continuously detect that the first image content is being utilized in an active online session of an application.

* * * * *